(12) United States Patent
Liu (10) Patent No.: US 9,039,310 B2
(45) Date of Patent: May 26, 2015

(54) INPUT DEVICE

(75) Inventor: Chia-Hung Liu, Taoyuan (TW)

(73) Assignee: DARFON ELECTRONICS CORP., Gueishan, Taoyuan (TW)

( * ) Notice: Subject to any disclaimer, the term of this patent is extended or adjusted under 35 U.S.C. 154(b) by 631 days.

(21) Appl. No.: 13/411,647

(22) Filed: Mar. 5, 2012

(65) Prior Publication Data

US 2012/0229309 A1 Sep. 13, 2012

(30) Foreign Application Priority Data

Mar. 10, 2011 (TW) .............................. 100108067 A (51) Int. Cl.
*G06F 3/02* (2006.01)
*H01H 13/86* (2006.01)

(52) U.S. Cl.
CPC .............. *H01H 13/86* (2013.01); *G06F 3/0221* (2013.01); *H01H 2223/046* (2013.01); *H01H 2223/052* (2013.01)

(58) Field of Classification Search
CPC ... G06F 1/1624; G06F 1/1662; G06F 1/1669; G06F 3/0221; G06F 3/02; G06F 3/202
USPC ................................................. 400/472, 476
See application file for complete search history.

(56) References Cited

U.S. PATENT DOCUMENTS

| | | | | |
|---|---|---|---|---|
| 5,687,058 A * | 11/1997 | Roylance | ................. | 361/679.14 |
| 7,221,330 B2 * | 5/2007 | Finke-Anlauff | ............... | 345/1.1 |
| D565,048 S | 3/2008 | Jawerth | | |
| D582,422 S | 12/2008 | Ikeda | | |
| 7,764,489 B2 * | 7/2010 | Kim et al. | ................ | 361/679.16 |
| 7,946,774 B2 * | 5/2011 | Matias | .......................... | 400/472 |
| 8,427,829 B2 * | 4/2013 | Hsu et al. | ................. | 361/679.56 |
| 8,514,558 B2 * | 8/2013 | Song | ......................... | 361/679.27 |
| 8,560,003 B2 * | 10/2013 | Kwak et al. | ................ | 455/550.1 |
| 8,582,280 B2 * | 11/2013 | Ryu | ......................... | 361/679.14 |
| 2003/0048596 A1 * | 3/2003 | Hsieh et al. | .................... | 361/680 |
| 2003/0122690 A1 * | 7/2003 | Hsu | ................. | 341/22 |
| 2003/0197628 A1 * | 10/2003 | Hsu | ................. | 341/22 |
| 2008/0285215 A1 * | 11/2008 | Kim et al. | ..................... | 361/680 |
| 2009/0186650 A1 * | 7/2009 | Kwak et al. | ................ | 455/550.1 |
| 2010/0014905 A1 * | 1/2010 | Morris | .......................... | 400/489 |
| 2010/0060587 A1 * | 3/2010 | Freund | .......................... | 345/169 |
| 2010/0149742 A1 * | 6/2010 | Lin et al. | .................. | 361/679.09 |
| 2010/0289748 A1 * | 11/2010 | Ryu | ......................... | 345/169 |
| 2011/0006971 A1 * | 1/2011 | Ebey et al. | ..................... | 345/1.3 |
| 2011/0009170 A1 * | 1/2011 | Xiao | ............................ | 455/566 |
| 2011/0117968 A1 * | 5/2011 | Eromaki | ........................ | 455/566 |
| 2011/0157020 A1 * | 6/2011 | Huang et al. | .................. | 345/167 |
| 2011/0157804 A1 * | 6/2011 | Chen et al. | ............... | 361/679.14 |
| 2012/0243162 A1 * | 9/2012 | Liu et al. | .................. | 361/679.15 |
| 2014/0055936 A1 * | 2/2014 | Wang | ....................... | 361/679.15 |

FOREIGN PATENT DOCUMENTS

TW M253050 12/2004

* cited by examiner

*Primary Examiner* — David Banh
(74) *Attorney, Agent, or Firm* — Winston Hsu; Scott Margo (57) ABSTRACT

An input device includes a casing, a first keyboard, and a second keyboard. The first keyboard is slidably connected to the casing. The second keyboard is connected to the casing in an obliquely slidable manner and slidably connected to the first keyboard. When the first keyboard slides toward an expanded position relative to the casing, the first keyboard drives the second keyboard to slide obliquely relative to the casing, so that the second keyboard slides upwardly relative to the first keyboard. When the first keyboard slides toward a folded position relative to the casing, the first keyboard drives the second keyboard to slide obliquely relative to the casing, so that the second keyboard slides downwardly relative to the first keyboard.

11 Claims, 8 Drawing Sheets

INPUT DEVICE

BACKGROUND OF THE INVENTION

1. Field of the Invention

The present invention relates to an input device, and more specifically, to an input device utilizing a sliding member of a second keyboard to slide relative to a first keyboard and a guide rail of a casing for performing an expanding operation or a folding operation.

2. Description of the Prior Art

In recent years, a portable electronic device (e.g. a PDA (Personal Digital Assistant) or a mobile phone) has been widely used in daily life. For improving its portability, omission of a keyboard or reducing a volume of a keyboard (e.g. reducing number of keyswitches on the keyboard) is usually applied to the portable electronic device. However, the said designs usually cause a user much inconvenience in performing paperwork operations. Thus, a foldable keyboard has been developed accordingly.

A conventional foldable design is to utilize hinges to be pivotally connected between foldable sections of a keyboard for making the keyboard foldable. However, the said design may cause a complicated structure and influence the outer appearance and the input operations of the keyboard due to disposal of the hinges.

SUMMARY OF THE INVENTION

The present invention provides an input device including a casing, a first keyboard, and a second keyboard. The first keyboard is slidably connected to the casing. The second keyboard is connected to the casing in an obliquely slidable manner and slidably connected to the first keyboard. When the first keyboard slides toward an expanded position relative to the casing, the first keyboard drives the second keyboard to slide obliquely relative to the casing, so that the second keyboard slides upwardly relative to the first keyboard. When the first keyboard slides toward a folded position relative to the casing, the first keyboard drives the second keyboard to slide obliquely relative to the casing, so that the second keyboard slides downwardly relative to the first keyboard.

The present invention further provides an input device including a casing, a first keyboard, and a second keyboard. At least one oblique guide rail is formed on at least one inner wall of the casing. The first keyboard is slidably connected to the casing and has at least one first transverse guide rail and a longitudinal guide rail. The second keyboard includes a first sliding member and a second sliding member. The first sliding member is used for sliding along the first transverse guide rail and the longitudinal guide rail so as to make the second keyboard slidably connected to the first keyboard. The second sliding member is slidably disposed in the oblique guide rail for making the second keyboard connected to the casing in an obliquely slidable manner. When the first keyboard slides toward an expanded position relative to the casing, the first sliding member passes through the first transverse guide rail to abut against the longitudinal guide rail for driving the second sliding member to slide along the oblique guide rail, so that the first sliding member slides upwardly along the longitudinal guide rail. When the first keyboard slides toward a folded position, the longitudinal guide rail abuts against the first sliding member for driving the second sliding member to slide along the oblique guide rail, so that the first sliding member slides downwardly along the longitudinal guide rail.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
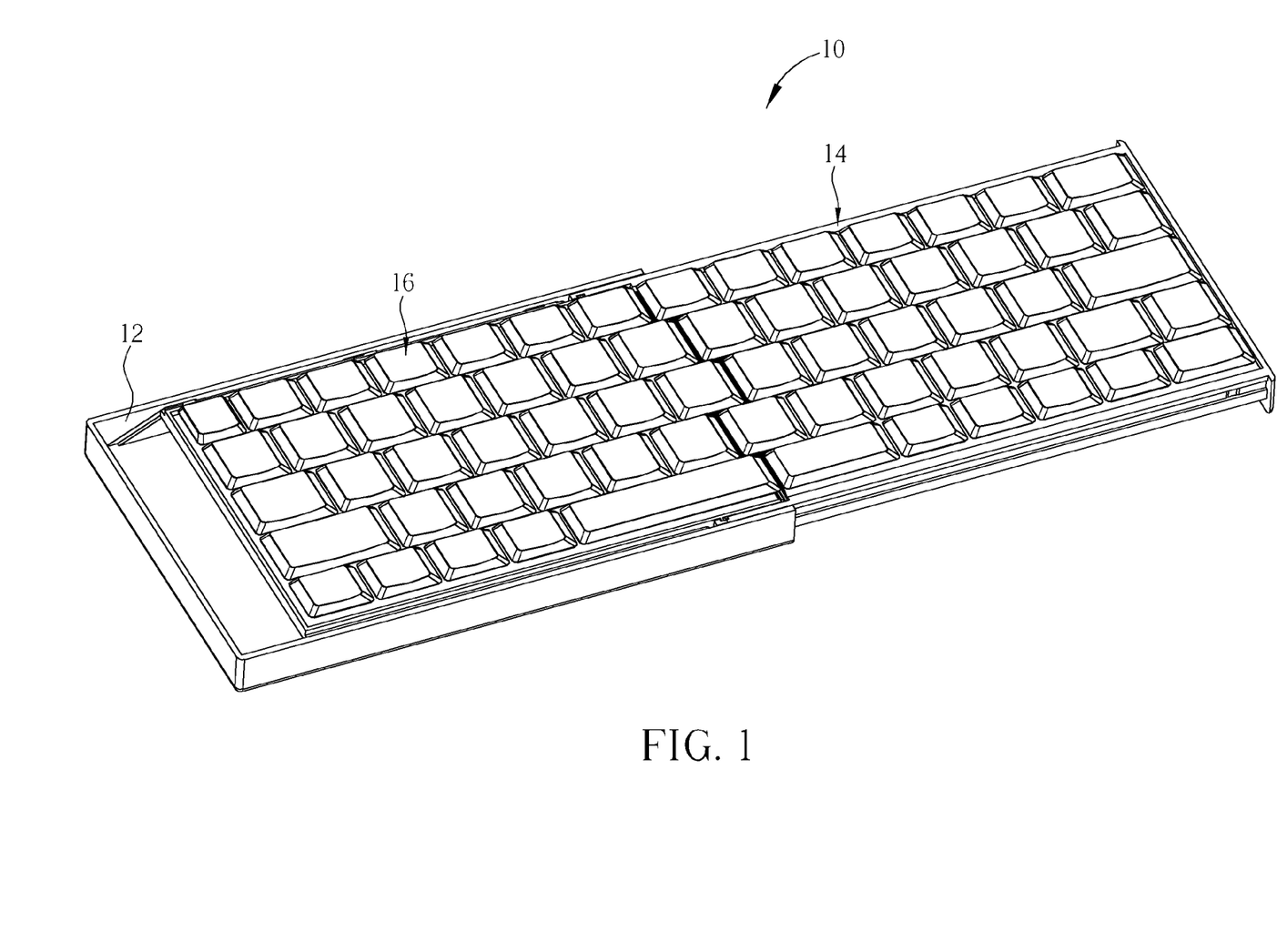
FIG. 1 is a diagram of an input device in an expanded state according to a preferred embodiment of the present invention.
Figure 2:
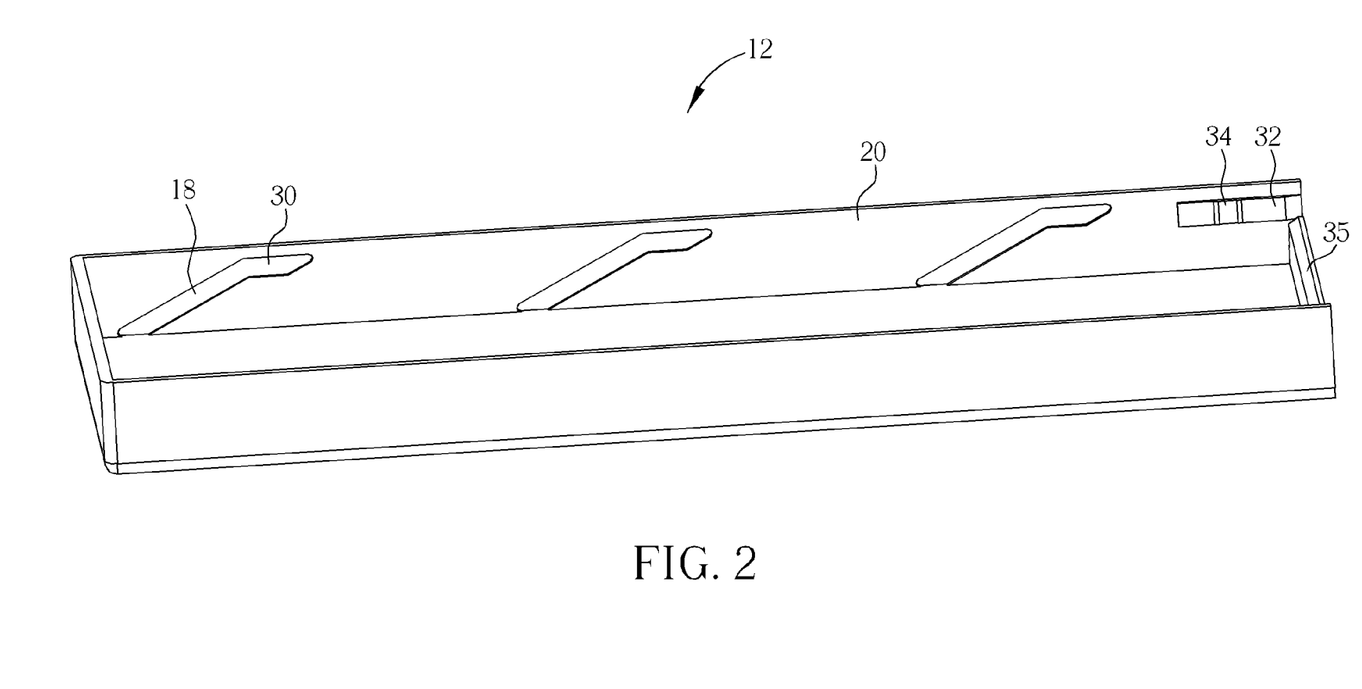
FIG. 2 is an enlarged diagram of a casing in FIG. 1.
Figure 3:
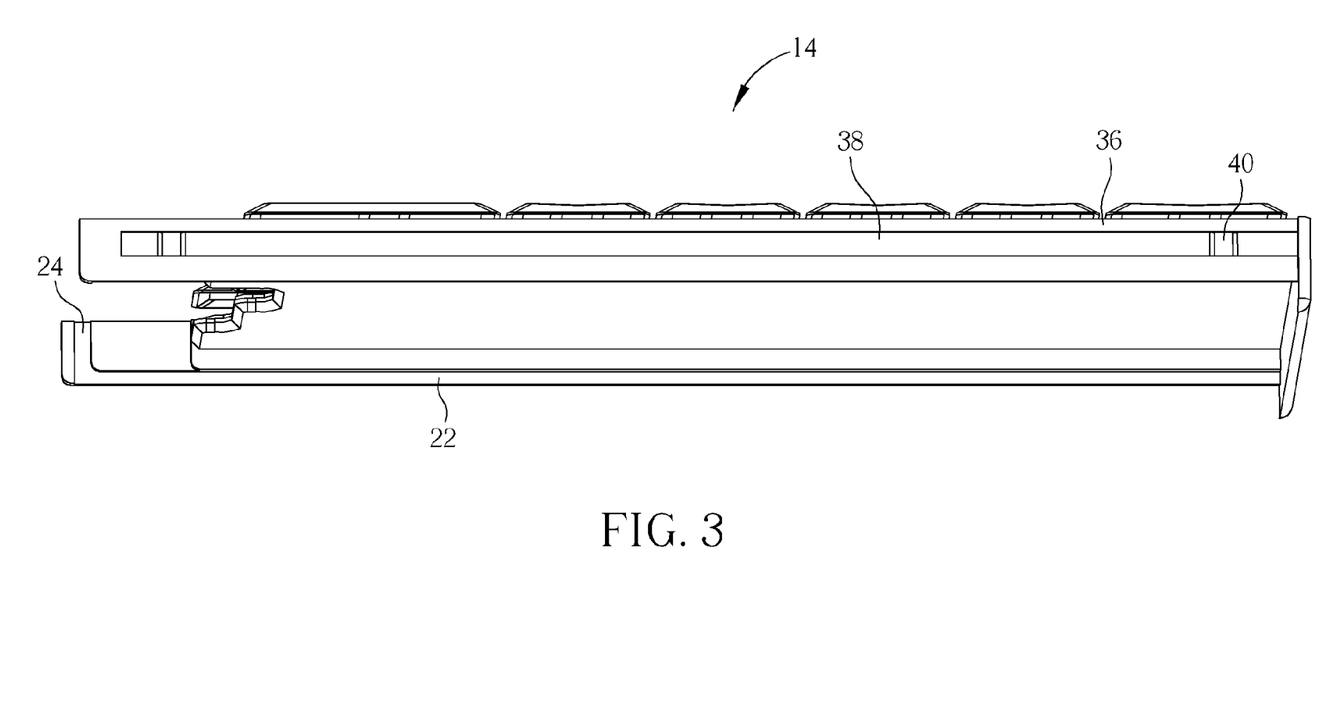
FIG. 3 is an enlarged diagram of a first keyboard in FIG. 1.
Figure 4:
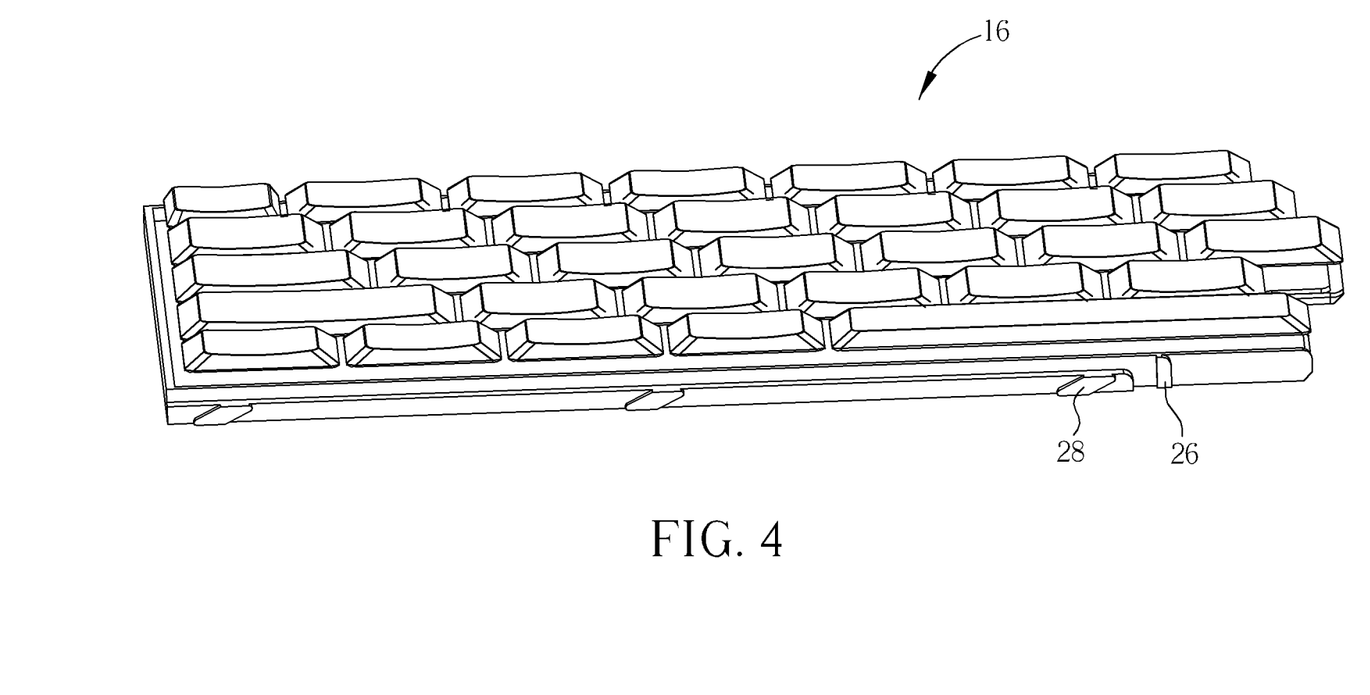
FIG. 4 is an enlarged diagram of a second keyboard in FIG. 1.

Please refer to FIG. 1, which is a diagram of an input device 10 in an expanded state according to a preferred embodiment of the present invention. The input device 10 includes a casing 12, a first keyboard 14, and a second keyboard 16. The casing 12 is used for containing the first keyboard 14 and the second keyboard 16. Next, please refer to FIG. 2, FIG. 3, and FIG. 4. FIG. 2 is an enlarged diagram of the casing 12 in FIG. 1. FIG. 3 is an enlarged diagram of the first keyboard 14 in FIG. 1. FIG. 4 is an enlarged diagram of the second keyboard 16 in FIG. 1. As shown in FIG. 2, FIG. 3, and FIG. 4, at least one oblique guide rail 18 (three shown at the left and right sides of the casing 12 in FIG. 2 respectively) is formed on an inner wall 20 of the casing 12. The first keyboard 14 has at least one first transverse guide rail 22 (one shown at the left and right sides of the first keyboard 14 in FIG. 3 respectively) and a corresponding longitudinal guide rail 24 communicated with the first transverse guide rail 22. The second keyboard 16 includes at least one first sliding member 26 (one shown at the left and right sides of the second keyboard 16 in FIG. 4 respectively) and a second sliding member 28 corresponding to the oblique guide rail 18. The first sliding member 28 can slide along the first transverse guide rail 22 and the longitudinal guide rail 24 so that the second keyboard 16 can be slidably connected to the first keyboard 14. The second sliding member 28 is slidably disposed in the oblique guide rail 18, so that the second keyboard 16 can be connected to the casing 12 in an obliquely slidable manner. Furthermore, the casing 12 further includes a corresponding second transverse guide rail 30 extendedly communicated with the oblique guide rail 18. Accordingly, the second sliding member 28 can slide along the second transverse guide rail 30 transversely after passing through the oblique guide rail 18. It should be mentioned that the longitudinal guide rail 24 is substantially perpendicular to the first transverse guide rail 22 and the second transverse guide rail 30 is substantially parallel to the first transverse guide rail 22 in this embodiment.

Furthermore, as shown in FIG. 2 and FIG. 3, the inner wall 20 of the casing 12 has at least one guide portion 32 (one shown at the left and right sides of the casing 12 in FIG. 2 respectively) and a corresponding engaging portion 34 formed on the guide portion 32. A sliding slot 38 is formed on an outer surface 36 of the first keyboard 14 corresponding to the engaging portion 34. The guide portion 32 is used for cooperating with the sliding slot 38 so that the first keyboard 14 can slide leftward and rightward along the casing 12 via sliding of the guide portion 32 along the sliding slot 38. A positioning structure 40 is further formed in the sliding slot 38 of the first keyboard 14 corresponding to the engaging portion 34. The engaging portion 34 is used for engaging with the positioning structure 40 so as to fix a position of the first keyboard relative to the casing 12. In this embodiment, the engaging portion 34 is a protruding point structure and the positioning structure 40 is a concave hole structure corresponding to the protruding point structure.

Figure 5:
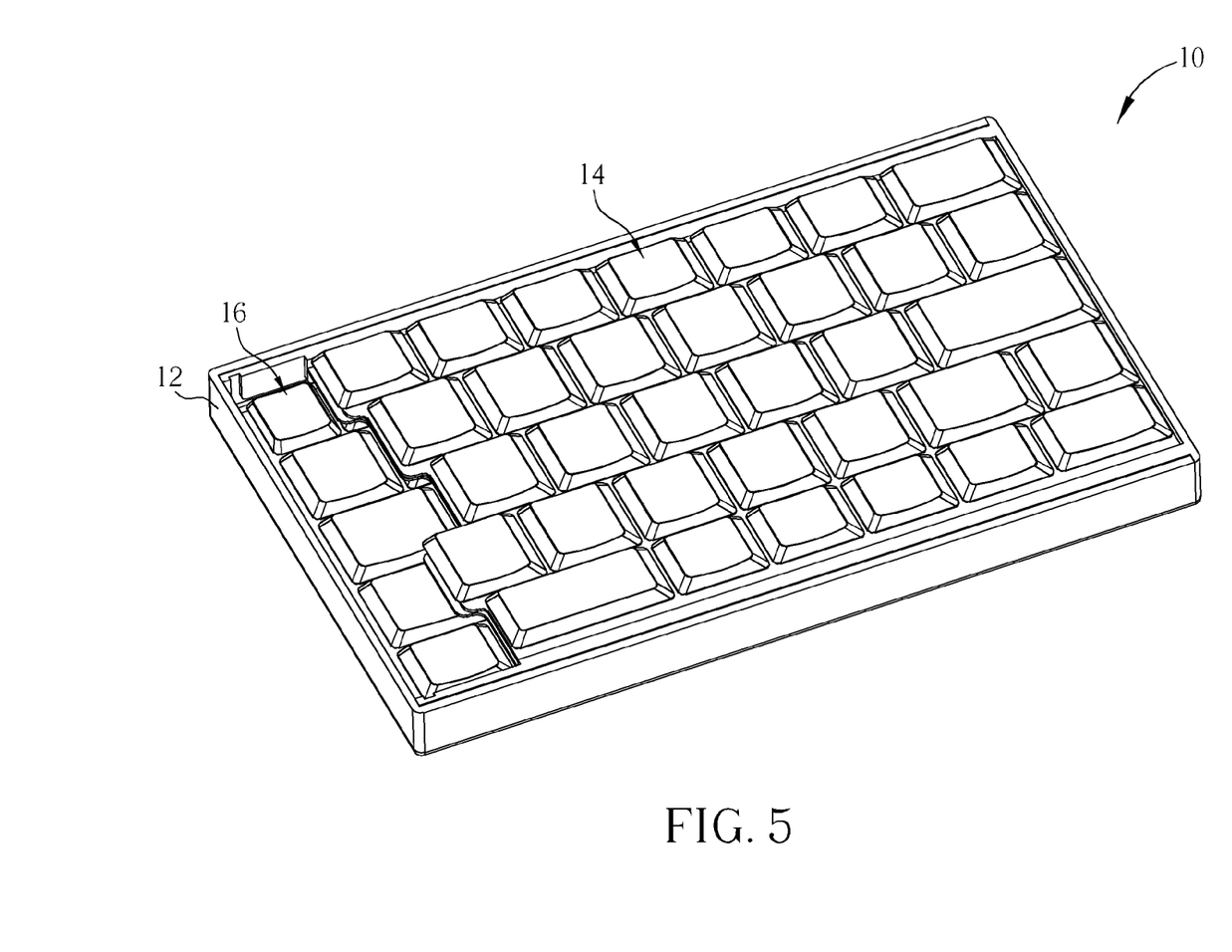
FIG. 5 is a diagram of the input device in FIG. 1 in a folded state.

More detailed description for folding and expanding operations of the input device 10 is provided as follows. At first, please refer to FIG. 5, which is a diagram of the input device 10 in FIG. 1 in a folded state. When the input device 10 is in the folded state as shown in FIG. 5, the first keyboard 14 is stacked on the second keyboard 16 and is contained in the casing together with the second keyboard 16 for convenient storage or carrying.

Figure 6:
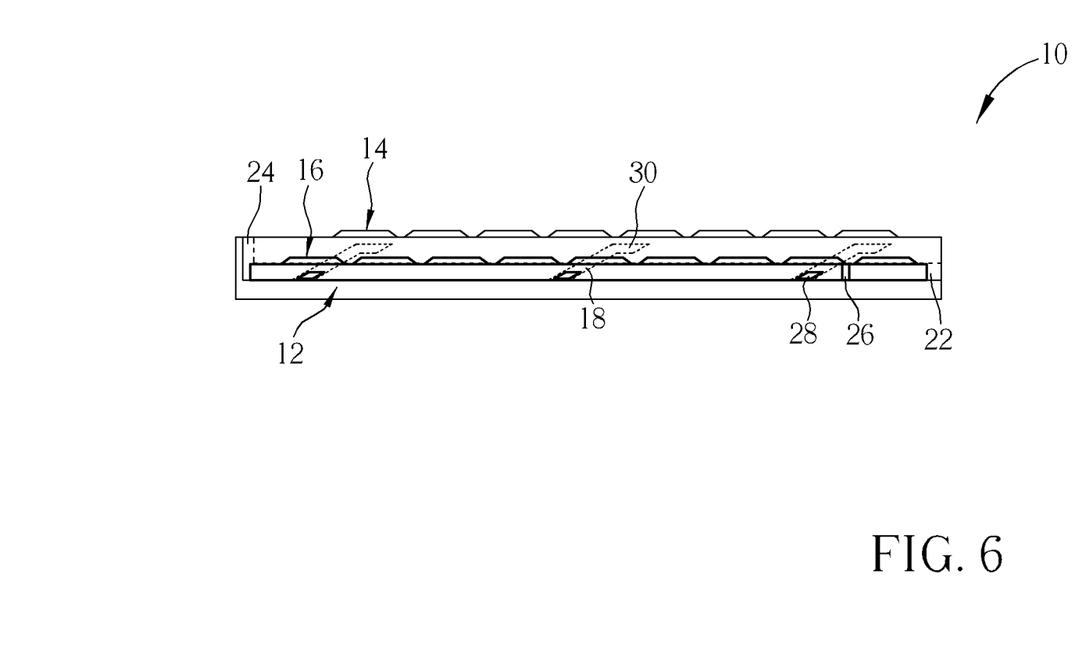
FIG. 6 is a side view of the input device in FIG. 5 when the first keyboard is located at the folded position.
Figure 7:
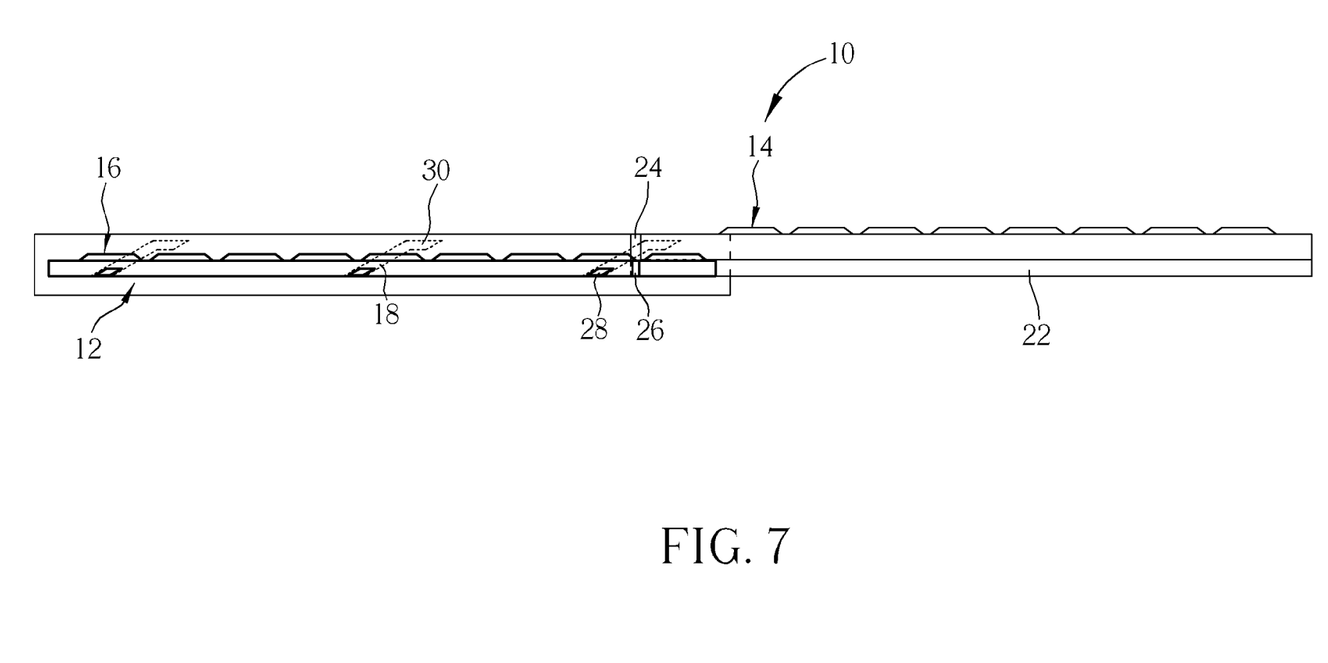
FIG. 7 is a side view of the first keyboard in FIG. 6 sliding to a position where a longitudinal guide rail abuts against a first sliding member of the second keyboard.
Figure 8:
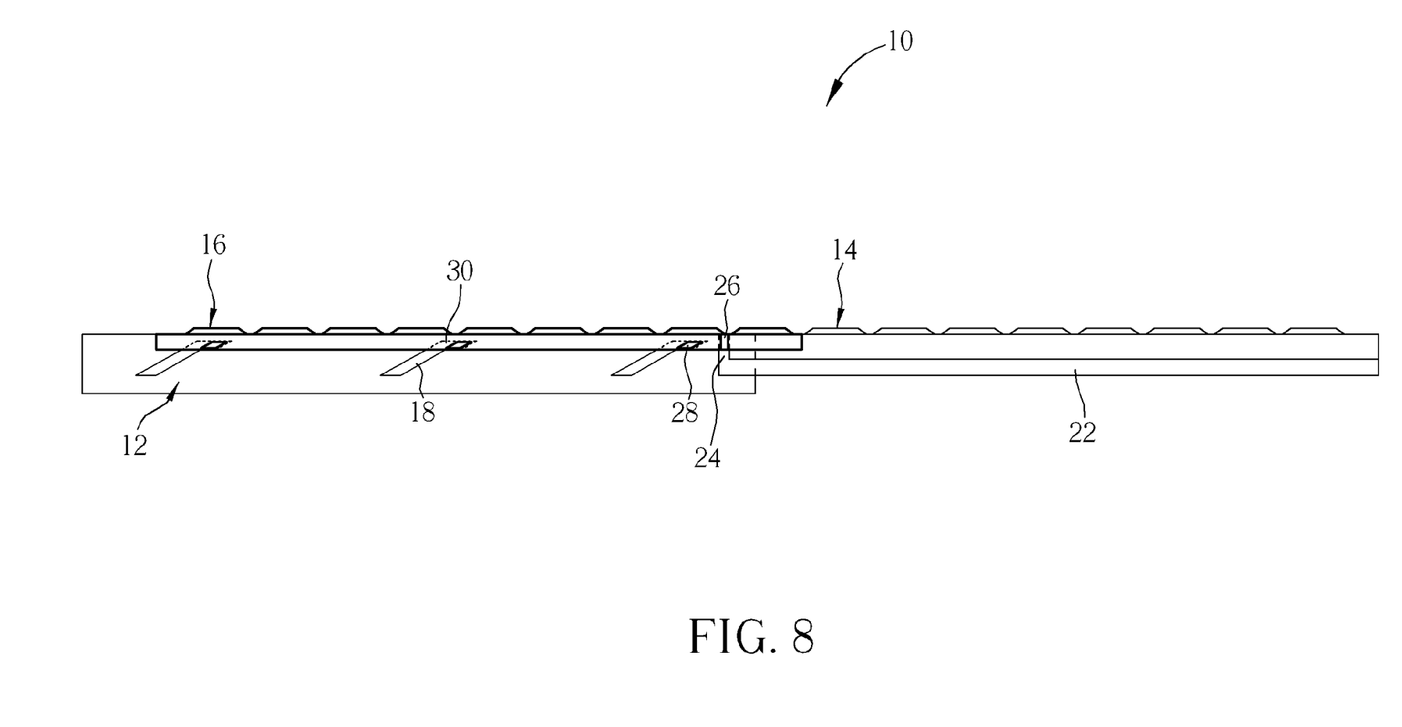
FIG. 8 is a side view of the input device in FIG. 7 when the first keyboard slides to the expanded position.

Next, please refer to FIG. 5, FIG. 6, FIG. 7, and FIG. 8. FIG. 6 is a side view of the input device 10 in FIG. 5 when the first keyboard 14 is located at a folded position. FIG. 7 is a side view of the first keyboard 14 in FIG. 6 sliding to a position where the longitudinal guide rail 24 abuts against the first sliding member 26 of the second keyboard 14. FIG. 8 is a side view of the input device 10 in FIG. 7 when the first keyboard 14 slides to an expanded position. When a user wants to expand the input device 10 for performing input operations, the user just needs to pull the first keyboard 14 in FIG. 5 to slide outwardly relative to the casing 12 from the folded position as shown in FIG. 6 to the position as shown in FIG. 7. At this time, the longitudinal guide rail 24 abuts against the first sliding member 26 of the second keyboard 16 after the first sliding member 26 passes through the first transverse guide rail 22. Subsequently, if the user keeps pulling the first keyboard 14 to slide outwardly relative to the casing 12, the second keyboard 16 slides together with the first keyboard 14 until the first keyboard 14 is pulled to the expanded position as shown in FIG. 8. During the said process, as shown in FIG. 7 and FIG. 8, the second sliding member 28 of the second keyboard 16 slides obliquely along the oblique guide rail 18 and then slides transversely along the second transverse guide rail 30. Simultaneously, the first sliding member 26 of the second keyboard 16 also slides upwardly along the longitudinal guide rail 24 of the first keyboard 14. In such a manner, when the first keyboard 14 is pulled to the expanded position as shown in FIG. 8. The second keyboard 16 can slide upwardly to a position where the second keyboard 16 is connected to the first keyboard 26 at the same plane (as shown in FIG. 1). Accordingly, the input device 10 in the expanded state can be electrically connected to a corresponding electronic device (e.g. a PDA or a mobile phone) in a wired or wireless manner for subsequent input operations.

To be noted, as shown in FIG. 2 and FIG. 3, during the process of the first keyboard 14 sliding outwardly relative to the casing 12, the guide portion 32 of the casing 12 can be cooperated with the sliding slot 38 of the first keyboard 14, so as to make sliding of the first keyboard 14 relative to the casing 12 more smooth. Furthermore, when the first keyboard 14 is located at the expanded position as shown in FIG. 8, the engaging portion 34 of the casing 12 is simultaneously engaged with the positioning structure 40 in the sliding slot 38 of the first keyboard 14, so as to fix the first keyboard 14 at the expanded position more steadily.

Besides, as mentioned above, when the first keyboard 14 is located at the expanded position as shown in FIG. 8, the second sliding member 28 of the second keyboard 16 is located in the second transverse guide rail 30 of the casing 12, the guide portion 32 of the casing 12 is cooperated with the sliding slot 38 of the first keyboard 14, and the engaging portion 34 of the casing 12 is engaged with the positioning structure 40 of the first keyboard 14. At the same time, the bottom surface of the first keyboard 14 is supported by a support portion 35 of the casing 12 as shown in FIG. 2. Thus, when the input device 10 is in the expanded state as shown in FIG. 1, the casing 12 can provide the first keyboard 14 and the second keyboard 16 with a sufficient support force to prevent floating of the first keyboard 14 and the second keyboard 16, so as to make the user feel more comfortable while typing the first keyboard 14 and the second keyboard 16.

On the other hand, if the user wants to fold up the input device 10 in the expanded state, the user just needs to push the first keyboard 14 in FIG. 1 to slide inwardly relative to the casing 12. At this time, since the longitudinal guide rail 24 still abuts against the first sliding member 26 (as shown in FIG. 8), the second keyboard 16 can slide together with the first keyboard 14 until the first keyboard 14 is pushed to the position as shown in FIG. 7. During the process of the second keyboard 16 sliding together with the first keyboard 14, as shown in FIG. 7 and FIG. 8, the second sliding member 28 of the second keyboard 16 slides transversely along the second transverse guide rail 30 and then slides obliquely downward along the oblique guide rail 18. Simultaneously, the first sliding member 26 of the second keyboard 16 slides downwardly along the longitudinal guide rail 24 of the first keyboard 14. In other words, when the first keyboard 14 is pushed to the position as shown in FIG. 7, the second keyboard 16 can slide downwardly to the position as shown in FIG. 7 via sliding of the first sliding member 26 along the longitudinal guide rail 24 and sliding of the second sliding member 28 along the second transverse guide rail 30 and the oblique guide rail 18. Subsequently, the user can keep pushing the first keyboard 14 to slide inwardly relative to the casing 12 until the first keyboard 14 slides to the folded position as shown in FIG. 6. During the said process, since the longitudinal guide rail 24 of the first keyboard 14 no longer abut against the first sliding member 26 of the second keyboard 16, the second keyboard 16 stops sliding with the first keyboard 14 and is then statically located at the position as shown in FIG. 6. Finally, the user can keep pushing the first keyboard 14 to be located above the second keyboard 16, so that the second keyboard 16 and the first keyboard 14 can be contained in the casing 12 (as shown in FIG. 5) for convenient storage or carrying.

Similarly, as shown in FIG. 2 and FIG. 3, when the first keyboard 14 is located at the folded position as shown in FIG. 6, the engaging portion 34 of the casing 12 can be also engaged with the corresponding positioning structure 40, so as to fix the first keyboard 14 at the folded position more steadily. Furthermore, disposal of the second transverse guide rail 30, the sliding slot 38, the positioning 40, the guide portion 32, the engaging portion 34, and the support portion 35 can be omitted selectively, so as to simplify the structural design of the input device 10.

Besides, the design of utilizing the first keyboard 14 to drive the second keyboard 16 is not limited to the design of utilizing the first sliding member 26 to abut against the longitudinal guide rail 24 according to the said embodiment. That is, all designs of driving the second keyboard 16 to slide together with the first keyboard 14 by one structure on the first keyboard 14 cooperating with another structure on the second keyboard 16 may fall within the scope of the present invention. For example, the first keyboard 14 can have a first hook structure instead, and the second keyboard 16 can have a corresponding second hook structure. Accordingly, when the first keyboard 14 slides toward the expanded position relative to the casing 12, the first keyboard 14 can drive the second keyboard 16 via engagement of the first hook structure with the second hook structure. As for description for the related design, it is commonly seen in the prior art and then omitted herein.

Compared with the prior art utilizing hinges to be pivotally connected between foldable sections of a keyboard for making the keyboard foldable, the input device provided by the present invention utilizes sliding of the sliding member of the second keyboard relative to the first keyboard and the guide rail of the casing to drive the second keyboard to slide upwardly or downwardly. Accordingly, when the first keyboard slides leftward and rightward relative to the casing, the second keyboard can be driven to slide upwardly to the position where the second keyboard is connected to the first keyboard at the same plane, or downwardly to the position where the second keyboard is located under the first keyboard. In such a manner, via cooperating of the said sliding members with the said guide rails, the present invention can not only simplify the structural design of the input device, but also solve the prior art problem that disposal of the hinges influences the outer appearance and the input operations of the keyboard. Furthermore, via the said simple pull and push operations, a user can conveniently expand or fold up the input device so that convenience of the input device in use can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input device comprising:
   a casing, at least one oblique guide rail being formed on at least one inner wall of the casing;
   a first keyboard slidably connected to the casing and having at least one first transverse guide rail and a guide rail perpendicular or oblique to the first transverse guide rail; and
   a second keyboard comprising:
      a first sliding member for sliding along the first transverse guide rail and the guide rail so as to make the second keyboard slidably connected to the first keyboard; and
      a second sliding member slidably disposed in the oblique guide rail for making the second keyboard connected to the casing in an obliquely slidable manner;
   wherein when the first keyboard slides toward an expanded position relative to the casing, the first sliding member passes through the first transverse guide rail to abut against the guide rail for driving the second sliding member to slide along the oblique guide rail, so that the first sliding member slides upwardly along the guide rail; when the first keyboard slides toward a folded position, the guide rail abuts against the first sliding member for driving the second sliding member to slide along the oblique guide rail, so that the first sliding member slides downwardly along the guide rail.

2. The input device of claim 1, wherein when the first keyboard slides from the folded position to the expanded position, the first sliding member passes through the first transverse guide rail and then slides upwardly along the guide rail to a position where the second keyboard is connected to the first keyboard at the same plane.

3. The input device of claim 1, wherein when the first keyboard slides from the expanded position to the folded position, the first sliding member slides downwardly along the guide rail to a position where the second keyboard is located under the first keyboard.

4. The input device of claim 1, wherein a second transverse guide rail is further formed on the casing and extendedly communicated with the oblique guide rail, and the second sliding member slides along the second transverse guide rail after passing through the oblique guide rail.

5. The input device of claim 4, wherein the second transverse guide rail is substantially parallel to the first transverse guide rail.

6. The input device of claim 1, wherein the inner wall of the casing has a guide portion, an outer surface of the first keyboard has a corresponding sliding slot formed thereon, and the guide portion is cooperated with the sliding slot for guiding the first keyboard to slide relative to the casing.

7. The input device of claim 6, wherein the inner wall of the casing has an engaging portion formed on the guide portion, at least one corresponding positioning structure is formed in the sliding slot of the first keyboard, and the engaging portion is used for engaging with the positioning structure to fix a position of the first keyboard relative to the casing.

8. The input device of claim 7, wherein when the first keyboard is located at the expanded position, the engaging portion is engaged with the positioning structure for fixing the first keyboard at the expanded position.

9. The input device of claim 7, wherein when the first keyboard is located at the folded position, the engaging portion is engaged with the positioning structure for fixing the first keyboard at the folded position.

10. The input device of claim 7, wherein the engaging portion is a protruding point structure, and the positioning structure is a corresponding concave hole structure.

11. The input device of claim 1, wherein the casing has a support portion for supporting the first keyboard.

* * * * *